United States Patent [19]

Shirato et al.

[11] Patent Number: 5,145,251
[45] Date of Patent: Sep. 8, 1992

[54] EXTRUDER HAVING DEGREE-OF-KNEADING ADJUSTING DEVICE

[75] Inventors: Toru Shirato; Hideki Mizuguchi; Minoru Yoshida, all of Hiroshima, Japan

[73] Assignee: The Japan Steel Works, Ltd., Tokyo, Japan

[21] Appl. No.: 607,799

[22] Filed: Oct. 31, 1990

Related U.S. Application Data

[63] Continuation of Ser. No. 349,552, May 9, 1989, abandoned.

[30] Foreign Application Priority Data

May 17, 1988 [JP] Japan ................................ 63-118122
Aug. 4, 1988 [JP] Japan ................................ 63-193450
Sep. 30, 1988 [JP] Japan ................................ 63-243925

[51] Int. Cl.$^5$ .......................... B29B 7/48; B01F 7/08
[52] U.S. Cl. ........................................ 366/80; 366/75; 366/81; 366/85; 366/88
[58] Field of Search .................... 366/80, 85, 86, 90, 366/97, 318, 322, 79, 81–86; 425/208, 209

[56] References Cited

U.S. PATENT DOCUMENTS

| | | | |
|---|---|---|---|
| 3,008,184 | 11/1961 | Fritsch | 425/208 X |
| 3,198,491 | 8/1965 | Loomans et al. | 366/85 X |
| 3,280,425 | 10/1966 | Beck et al. | 366/80 X |
| 3,823,921 | 7/1974 | Brennan, Jr. et al. | 366/85 X |
| 3,870,285 | 3/1975 | Bausch et al. | 366/80 |
| 3,883,122 | 5/1975 | Werner | 366/85 |
| 4,103,355 | 7/1978 | Weber | 366/90 |
| 4,136,968 | 1/1979 | Todd | 366/85 |
| 4,462,691 | 7/1984 | Boguslawski | 366/80 |

FOREIGN PATENT DOCUMENTS

| | | | |
|---|---|---|---|
| 116773 | 8/1984 | | |
| 631436 | 6/1936 | Fed. Rep. of Germany | 425/208 |
| 1909818 | 10/1969 | Fed. Rep. of Germany . | |
| 3042427 | 5/1982 | Fed. Rep. of Germany | 366/85 |
| 3407789 | 10/1984 | Fed. Rep. of Germany . | |
| 2197635 | 3/1974 | France . | |
| 158014 | 12/1982 | German Democratic Rep. | 425/208 |
| 61-241123 | 10/1986 | Japan . | |
| 1220664 | 1/1971 | United Kingdom . | |
| 2033241 | 5/1980 | United Kingdom . | |

Primary Examiner—Harvey C. Hornsby
Assistant Examiner—Scott J. Haugland
Attorney, Agent, or Firm—Sughrue, Mion, Zinn, Macpeak & Seas

[57] ABSTRACT

A resin extruder in which the degree-of-kneading of the resin can be effectively controlled. The invention can be applied to both a single-screw extruder and a twin-screw extruder. In either case, blocking walls are formed around a cylindrical portion of the screw or screws just upstream of the kneading section. A valve structure is provided in the walls to control the kneading of resin at the kneading section.

1 Claim, 11 Drawing Sheets

RESIN FLOW
DIRECTION

EXTRUDER HAVING DEGREE-OF-KNEADING ADJUSTING DEVICE

This is a continuation of application Ser. No. 07/349,552, filed May 9, 1989, abandoned.

BACKGROUND OF THE INVENTION

The present invention relates to an extruder incorporating a degree of-kneading adjusting device.

In general, two types of extruders are known and in practical use, one being a single-screw extruder and the other a twin-screw type extruder.

In one example of a conventional degree-of-kneading adjusting device, as disclosed by Japanese Unexamined Published Patent Application No. 5450/1975, a cut is formed in a part of the flight of the screw. An inserting member protruding into the interior surface of extruder barrel in which the screw is received is positioned in the cut thus formed, the gap between the end portion of the inserting member and the screw being thereby adjusted.

Also, in one example of a conventional degree-of-kneading adjusting device for a twin-screw type extruder, as described in Japanese Unexamined Published Patent Application No. 233408/1986, the gap between the slot of the screw and the slot of the cylinder is utilized to control the flow of raw material during operation, thereby to adjust the degree of kneading.

In the case of the conventional device of Application No. 233408/1986, it is also necessary to move the extruder barrel (or screw) in its entirety for the purpose of adjusting the gap between the slots. Accordingly, it is, for instance, necessary to position the entire barrel on the rails, as a result of which the extruder construction unavoidably becomes complexed and extruder component parts increase in number. In addition, the gap between the slots changes due to differences in the amount of expansion between the barrel and the screw due to variations in temperature. Therefore, with the conventional device, it is difficult to control the degree of kneading effectively.

On the other hand, the conventional device of Application No. 5450/1975 is free from the above-described difficulties; however, it is still disadvantageous in that its degree-of-kneading controlling performance is not sufficient. Specifically, even if the gap between the inserting member and the screw is adjusted suitably, some of the resin will flow through paths other than the gap, and therefore it is difficult to control the whole flow of the resin as intended. That is, it is difficult to adjust the degree of kneading to a desired value according to physical and temperature properties of the resin.

SUMMARY OF THE INVENTION

Accordingly, an object of this invention is to eliminate the above-described difficulties accompanying a conventional degree-of-kneading adjusting device in an extruder.

The above-described problems have been solved by the provision of a single-screw extruder having a degree-of-kneading adjusting device in which, according to the invention, a blocking wall is provided in the barrel hole of the extruder, and the degree of opening of a communicating path for communicating the upstream side of the blocking wall with the downstream side is controlled with a valve. More specifically, in the extruder having a degree-of-kneading adjusting device according to the invention, the middle of the screw is formed into a cylindrical portion smaller in diameter than the flight thereof, a blocking wall smaller in diameter than other barrel bore (or hole of the barrel) so that it is engaged with the screw's cylindrical portion with a small gap therebetween is provided at the position, in the axial direction, corresponding to the screw's cylindrical portion in the hole of the barrel in which the screw is inserted, a communicating path to guide resin flow from the upstream side of the blocking wall to the downstream since in the barrel hole is formed in the blocking wall, and a valve is provided in the communicating path to control the degree of opening of the communicating path. The blocking wall may be in the form of a spiral continuous thread having two end portions which appear overlapped as viewed in the axial direction. In this case, the valve is provided between the two end portions of the spiral continuous thread.

The molten raw material upstream of the blocking wall can flow downstream only through the communicating path provided with the valve. Thus, with the inventive device, the area of communicating path can be controlled for all the degrees of opening ranging from complete closing of the path to full opening; that is, the degree of kneading can be adjusted to a desired value by controlling the degrees of the valve opening. Once the communicating path is narrowed by adjusting the control valve, the feed resin is restricted to flow the communicating path. As a result, the filling ratio and residence time of the feed resin at the kneading section of the screw increases and the degree of the kneading is raised.

The above-described problems have been also solved by the provision of a degree-of-kneading adjusting device for a twin-screw extruder in which, according to the invention, blocking walls are formed in the twin screw holes in the barrel, and communicating paths formed in the blocking walls are controlled in cross-sectional area. More specifically, the foregoing object of the invention has been achieved by the provision of a degree-of-kneading adjusting device for a twin-screw type extruder in which raw material fed into twin screw holes in the barrel in which the screws are inserted is heated and kneaded while being conveyed by two screws which are rotated in the same direction or counter rotational direction which being engaged with each other so as to extrude the resin. When viewed cross-section of the barrel, raw material fed into the screw channels is moving around along inside surfaces of the barrel as it is forwarded to downstream side. The typical flow pattern of the raw material is a gourd-shaped for co-rotating twin screw extruder and eight-shaped for counter rotating twin screw extruder. To control the different flow pattern of the raw material in the barrel, communicating path formed in the blocking wall is naturally different in co-rotating and counter rotating twin screw extruders to attain effective kneading. In the co-rotating twin-screw extruder according to the invention, each of the screws has a cylindrical portion adjacent to downstream side of a kneading section, which portion is smaller in diameter than the flight thereof; blocking walls made smaller in diameter than other barrel so that the blocking walls are engaged with the cylindrical portions of the screws with small gaps therebetween are provided at a position, in the axial direction, corresponding to the cylindrical portions in the twin screw holes and arranged in such a manner as to divide the twin screw holes into upstream and downstream halves, the blocking walls being in the form of a spiral continuous thread, the direction of twist of which is determined so that the raw material is conveyed forwardly as the screws are rotated; communicating paths are formed in portions of the blocking walls, which portions are positioned between the twin screw holes to divide the twin screw holes, in such a manner that one of the communicating paths communicates the upstream side of the blocking wall on the side of one of the twin screw holes with the downstream side of the blocking wall on the side of the other of the twin screw holes, whereas the other communicating path communicates the upstream side of the blocking wall on the side of the other of the twin screw holes with the downstream side of the blocking wall on the side of the one of the twin screw holes; and valve means for controlling the cross-sectional areas of the communicating paths are provided in respective ones of the communicating paths.

The blocking walls may be simple vertical walls instead of the spiral continuous thread. In this case, in the degree-of-kneading adjusting device according to the invention, each of the screws has a cylindrical portion at a part of the flight thereof in downstream side of a kneading section, the cylindrical portion being smaller in diameter than the flight; blocking walls made smaller in diameter than other walls so that the blocking walls are engaged with the cylindrical portions of the screws with small gaps therebetween are provided at a position, in the axial direction, corresponding to the cylindrical portions in the twin screw holes, and are in such a manner as to divide the twin screw holes into upstream and downstream sides, the blocking walls extending over the entire length of the cylindrical portions of the screws, communicating paths are formed in the blocking walls in such a manner that one of the communicating paths communicates the upstream side of the blocking wall on the side of one of the twin screw holes with the downstream side of the blocking wall on the side of the other of the twin screw holes, whereas the other communicating path communicates the upstream side of the blocking wall on the side of the other of the twin screw holes with the downstream side of the blocking wall on the side of the one of the twin screw holes; and valve means for controlling the cross-sectional areas of the communicating paths are provided in respective ones of the communicating paths.

In the counter-rotating twin-screw extruder according to the present invention, the communicating paths are formed in the portions of the blocking wall, which portions are positioned at the upper parts of the respective screws, in such a manner that the raw material to be moved along the inner wall of the barrel to the blocking wall separating the twin-screw holes is forced to flow into the communicating path and flow out to the downstream side of the blocking wall. The communicating paths may be formed in the blocking wall at the upper and lower sides of each screw to communicate the upstream side of the blocking wall with the downstream side thereof in the barrel.

The molten raw material forwarded to upstream side of the blocking walls can flow downstream only through the communicating paths provided with the valves. The area of communicating path is variable with the aids of the control valve. When communicating path is narrowed by the control valve, the flow of resin through communicating path is restricted so that the filling ratio and residence time of raw material at kneading section increase and consequently the degree of kneading is raised.

DESCRIPTION OF THE PREFERRED EMBODIMENTS

Figure 1:
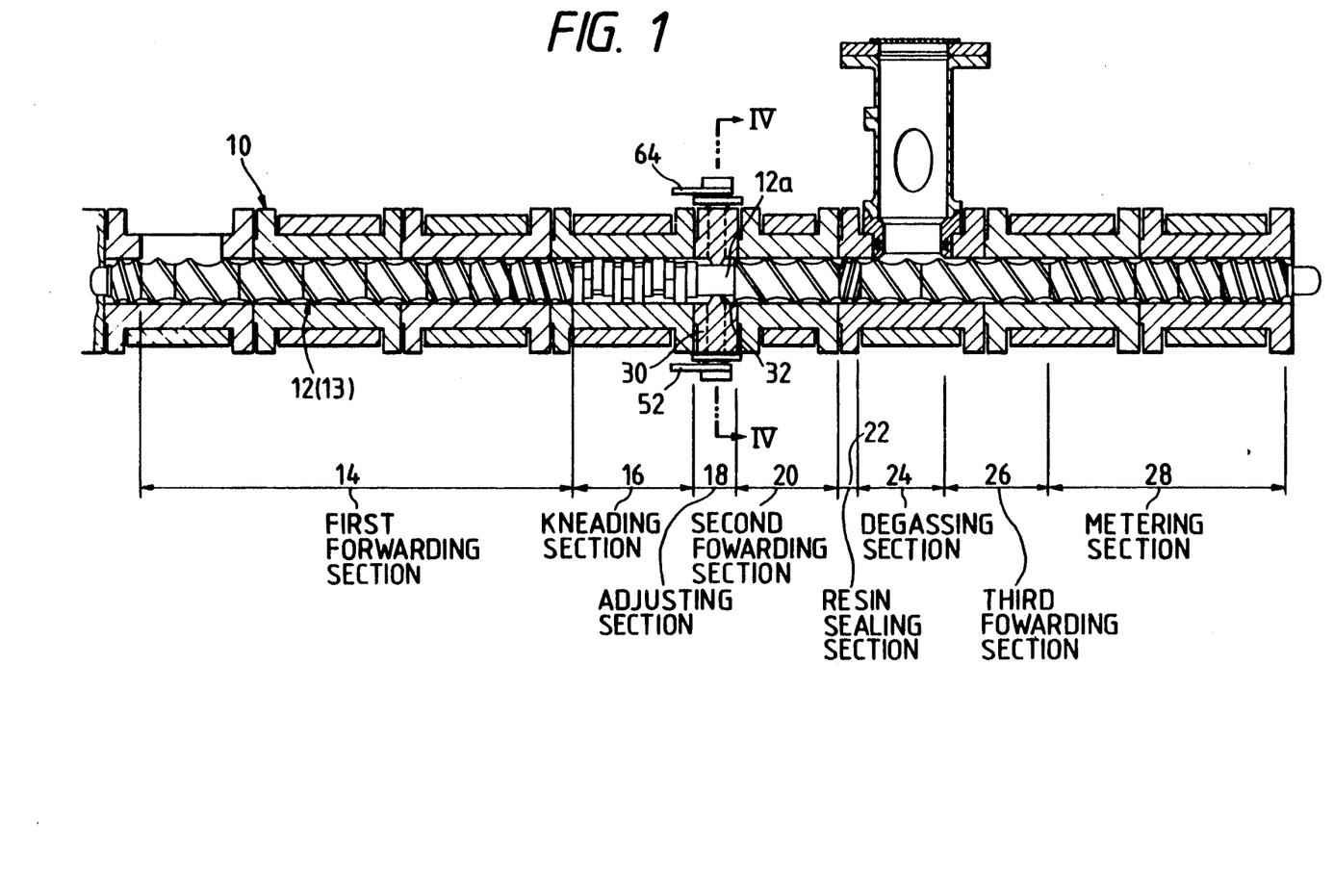
FIG. 1 is a sectional view showing a first embodiment of the invention, namely, a twin-screw extruder to which the technical concept of this invention is applied.

A twin-screw extruder constructed in accordance with a first embodiment of this invention is shown in FIG. 1.

This twin-screw extruder includes a barrel 10 formed by connecting a number of barrel units and two screws 12 and 13 inserted into the twin screw holes thereof (the screw 13 is not shown in FIG. 1). The twin-screw extruder further includes a first forwarding section 14, a kneading section 16, a degree-of kneading adjusting section 18, a second forwarding section 20, a resin sealing section 22, a degassing section 24, a third forwarding section 26, and a metering section 28, which are arranged in the stated order in the direction of flow of raw material to be handled.

Figure 2:
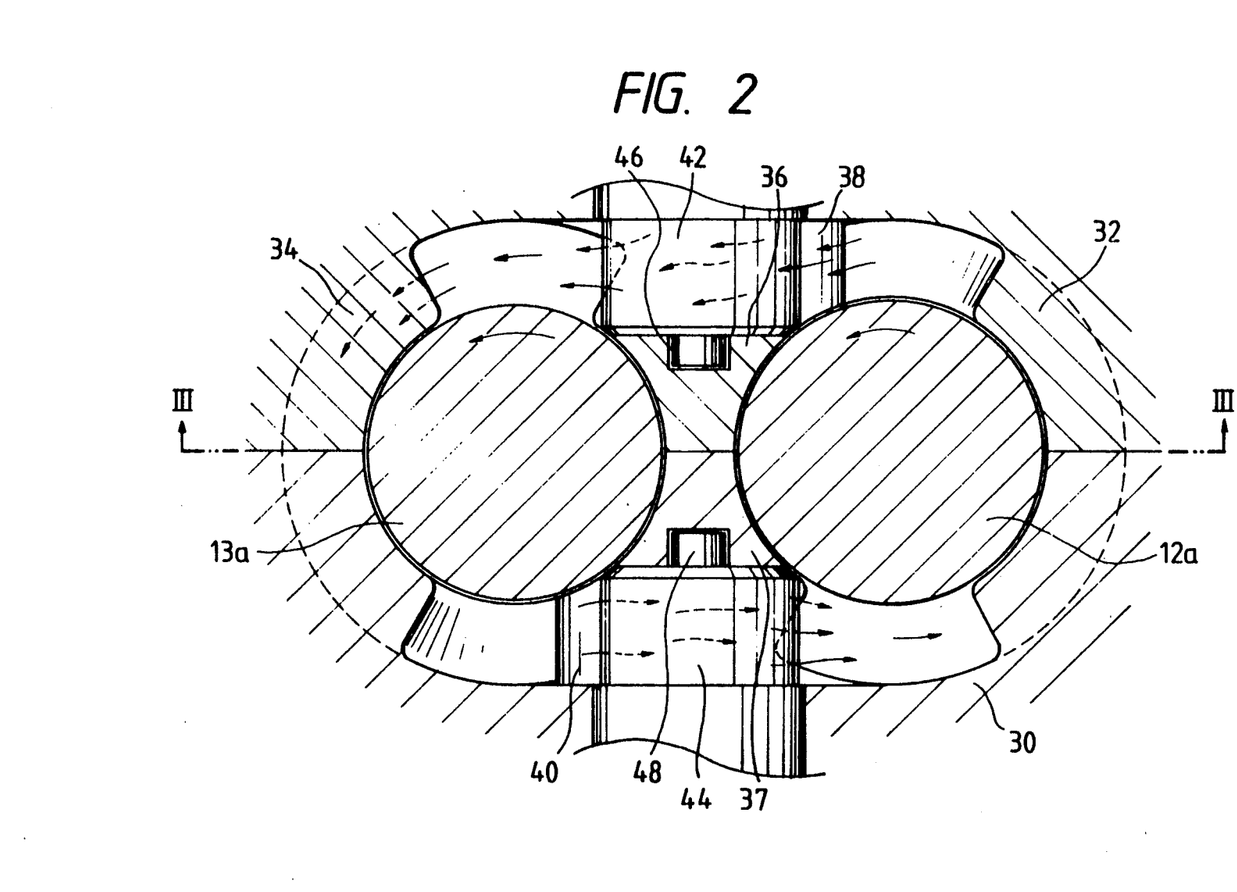
FIG. 2 is a sectional view showing a degree-of-kneading adjusting section in the twin screw co-rotating extruder of FIG. 1.
Figure 3:
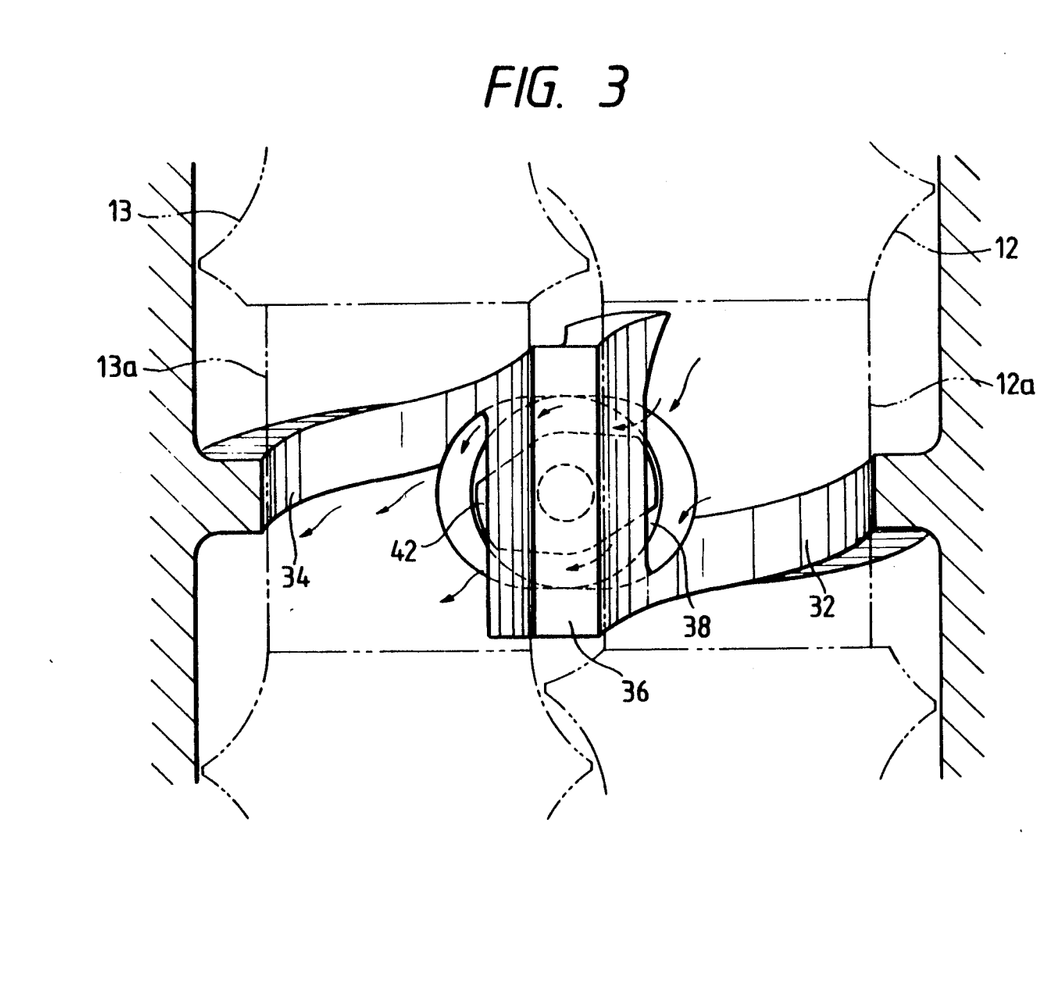
FIG. 3 is a sectional view taken along a line III—III in FIG. 2.
Figure 5:
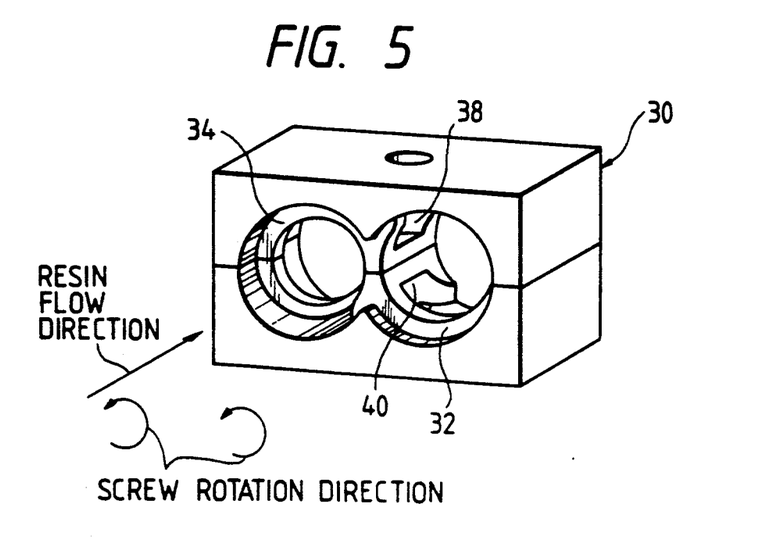
FIG. 5 is a perspective view showing the degree-of-kneading adjusting section in the extruder of FIG. 1.
Figure 6:
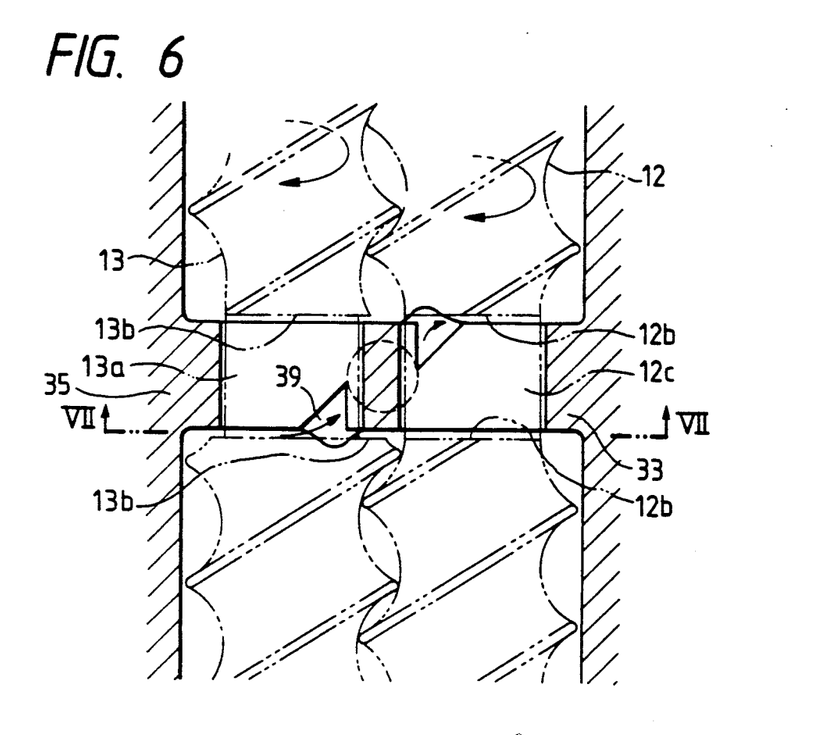
FIG. 6 is a sectional view showing second embodiment of the invention.
Figure 7:
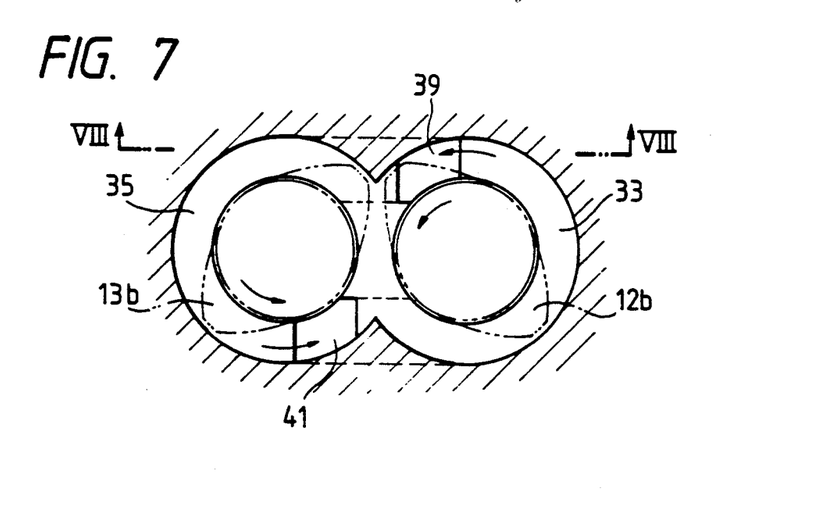
FIG. 7 is a sectional view taken along a line VII—VII in FIG. 6.

The degree-of-kneading adjusting section 18, as shown in FIGS. 2 and 3, has blocking walls 32 and 34 arranged in the twin screw holes formed in a barrel 30 composed of upper and lower halves. The inside diameters of the blocking walls 32 and 34 are slightly larger than the diameters of the cylindrical portions 12a and 13a (having no flight and having the same diameter as the bottom of the screw) of the screws 12 and 13, respectively. The blocking walls 32 and 34 are in the form of a spiral continuous thread. The direction of twist of the spiral continuous thread is such that, when the screws 12 and 13 are rotated counterclockwise in FIG. 2, the raw material is moved downstream of the blocking walls smoothly (or effectively). The blocking walls 32 and 34 extend about 360° C. Communicating paths 38 and 40 are formed in partition walls 36 and 37 which divide the twin screw holes in the blocking walls 32 and 34, respectively. As shown in FIG. 5, the communicating path 38 is constructed so as to communicate the upstream side of the blocking wall 32 in the hole on the side of the screw 12 with the downstream side of the blocking wall 34 in the hole on the side of the screw 13, whereas the communicating path 40 is designed so as to communicate the upstream side of the blocking wall 34 in the hole on the side of the screw 13 with the downstream side of the blocking wall 32 in the hole on the side of the screw 12. That is, the communicating paths 38 and 40 are holes formed in the barrel from above and below in FIG. 2.

Valves (a sort of butterfly valves) 42 and 44 are rotatably arranged on pivots 46 and 48. FIG. 2 shows the valves 42 and 44 communicating the twin screw holes with each other. When, from the state illustrated in FIG. 2, the valves 42 and 44 are turned through 90° C., the twin screw holes are not communicated with each other. The valves 42 and 44 are turned in opposite directions through a mechanism a shown in FIG. 4. This will be described in more detail.

Figure 4:
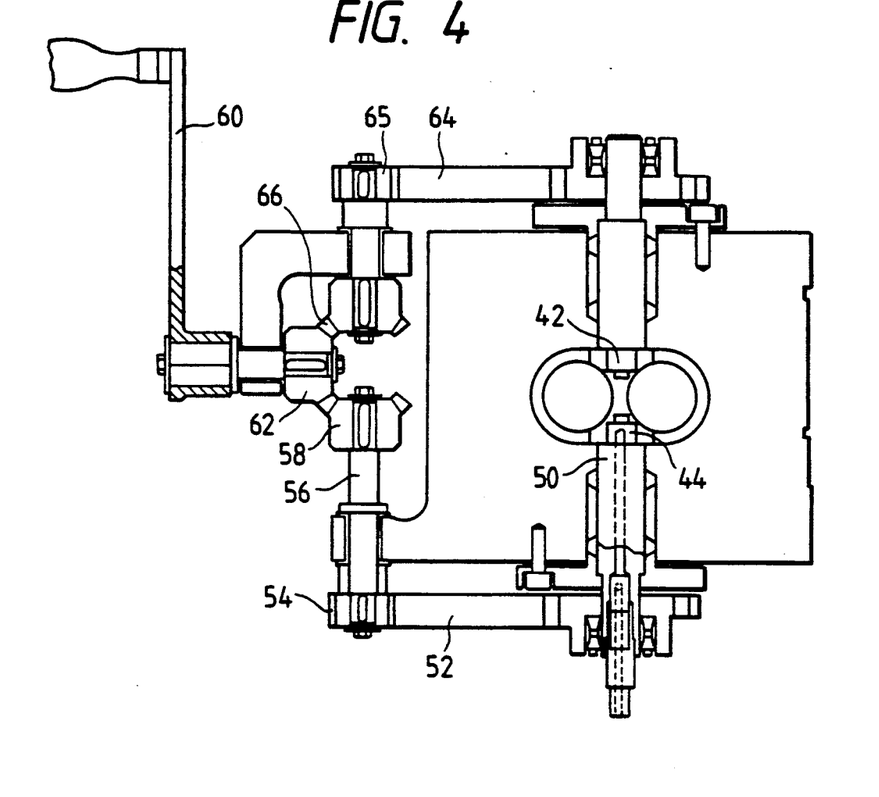
FIG. 4 is a sectional view taken along a line IV—IV in FIG. 1.

As shown in FIG. 4, a sector-shaped gear 52 is arranged so as to turn with a shaft 50 which is rotated together with the lower valve 44. The gear 52 is meshed with a gear 54, which is coupled through a shaft 56 to a bevel gear 58. The bevel gear 58 is meshed with a gear 62 which is turned with a handle 60. Similarly, the upper valve 42 is coupled through a sector-shaped gear 64, a gear 65 and a bevel gear 66 to the bevel gear 62. Therefore, when the handle 60 is rotated, the valves 42 and 44 are turned in opposite directions.

The operation of the co-rotating twin-screw extruder thus constructed will be described.

Figure 17:
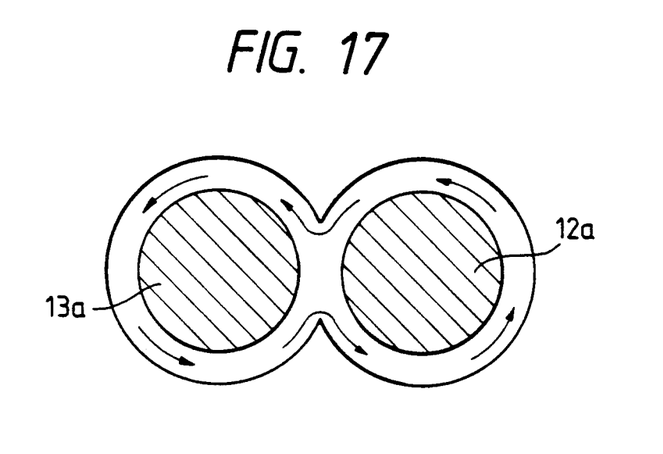
FIG. 17 is a flow pattern of raw material in cross section of twin screw co-rotating extruder.

The raw material put in the barrel 10 of the extruder is moved form the upstream end to the downstream end, or to the right in FIG. 1, by the screws 12 and 13. Since the screws 12 and 13 are rotated in the same direction, the flow pattern of raw material is, as shown in FIG. 17, gourd shaped along the inner walls of the twin screw holes in one direction only, as viewed at cross section of the screws that is, the resin will not flow cross-wise. The degree-of-kneading adjusting section 18 restricts the flow of raw material so that the raw material at the kneading section 16 is suitably kneaded. That is, the handle 60 is operated to run the valves 42 and 44 to adjust the cross-sectional areas of the communicating paths 38 and 40 between the twin screw holes to desired values, thereby to control the flow area of the raw material.

The communicating paths 38 and 40 are designed so as to guide the above-described flow of raw material along the inner walls. In FIG. 3, the valves 42 is shown positioned so that the communicating paths are largest in cross-sectional area. When, under this condition, the valves 42 and 44 are turned, the cross-sectional areas can be decreased. When the valves positioned as shown FIG. 3 are turned by 90° C., the communicating paths 38 and 40 are substantially completely closed. As the cross-sectional areas of the communicating paths 38 and 40 are decreased in the above-described manner, the resin is accumulated in the kneading section 16, where it is kneaded in the molten state while being greatly sheared. The degree of kneading go the resin depends on how long the resin is held in the kneading section 16. Substantially all of the resin must pass through the communicating paths 38 and 40. Therefore, the degree of kneading can be adjusted to a desired value by controlling the degrees of opening of the communicating paths. The blocking walls are in the form of the spiral continuous thread, as was described above, along which the resin flows smoothly. As a result, the resin will not locally accumulate.

In the above-described embodiment, the valves 42 and 44 are turned to control the cross-sectional areas of the communication paths; however, they may be modified so as to move vertically in FIG. 4. With the valves thus modified, the cross-sectional areas of the communicating paths between the twin screw holes can also be effectively controlled.

A second embodiment of the invention will now be described with reference to FIGS. 6 through 9.

The second embodiment has blocking walls 33 and 35 extending vertically. The blocking walls 33 and 35 are provided over the entire length of the cylindrical portions 12a and 13a of the screws 12 and 13; in other words, the cylindrical portions 12a and '13a having no flight are, over their entire length, fitted in the blocking walls 33 and 35 in such a manner that the end faces 12b and 13b, on the sides of the cylindrical portions, of the flights are confronted with the respective blocking walls 33 and 35 with small gaps therebetween.

Figure 8:
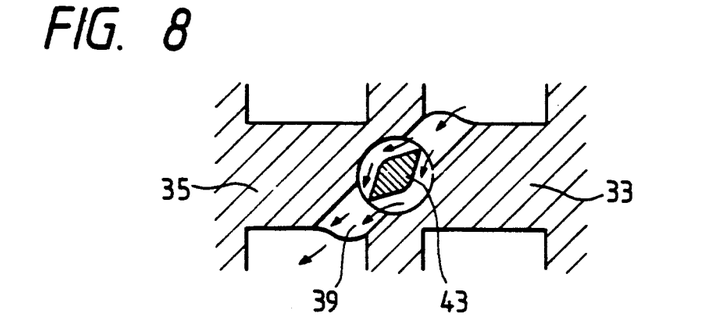
FIG. 8 is a sectional view taken along a line VIII—VIII in FIG. 7.
Figure 9:
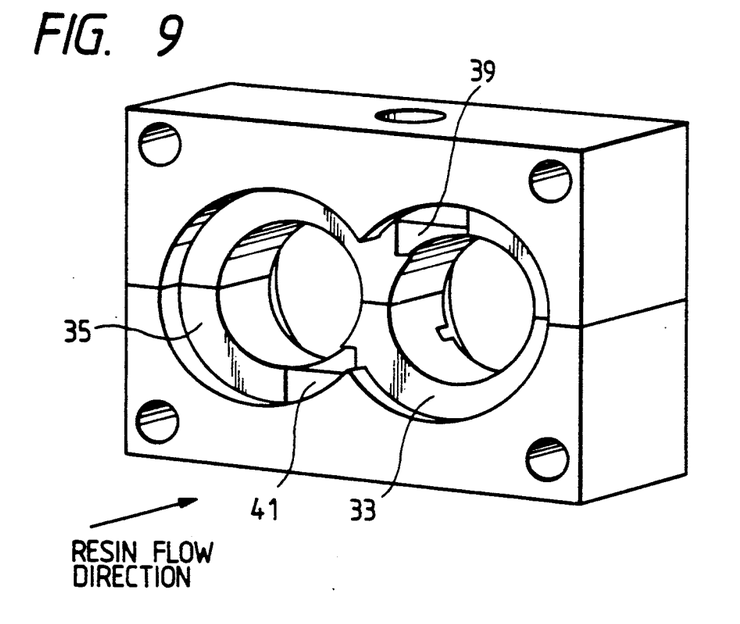
FIG. 9 is a perspective view showing a degree-of-kneading adjusting section in the second embodiment of the invention.

Communicating paths 39 and 41 are formed in the blocking walls 33 and 35. As shown in FIG. 9, the communicating path 39 is formed so as to communicate the upstream side of the blocking wall 33 in the hole on the side of the screw 12 with the downstream side of the blocking wall 35 in the hole on the side of the screw 13, whereas the communicating path 41 communicates the upstream side of the blocking wall 35 in the hole on the side of the screw 13 with the downstream side of the blocking wall 33 in the hole on the side of the screw 12. As shown in FIG. 4, valves 43 and 45 are provided in the communicating paths 39 and 41, respectively (the valve 45, not shown, being similar in construction to the valve 43). When the valves 43 (and 45) are positioned as shown in FIG. 8, the twin screw holes are communicated with each other. When, from this condition, they are turned through 90°, the twin screw holes are prevented from communicating with each other. The valves 43 and 45 are turned in opposite directions by a mechanism similar to that shown in FIG. 4 for the first embodiment.

In the second embodiment too all the resin passes through the communicating paths 39 and 41. Therefore, similar to the first embodiment, the degree of kneading can be accurately controlled by adjusting the degrees of opening of the valves 43 and 45. In addition, in the second embodiment, even if the resin is considerably low in fluidity, it will never stagnate around the blocking walls 33 and 35. This is because the screws are rotated with the flight end faces 12b and 13b held adjacent to the blocking walls 33 and 35, and therefore the resin near the blocking walls 33 and 35 is agitated and conveyed. In this operation, the resin is further sheared in the small gaps between the flight end faces 12b and 13b and the blocking walls 33 and 35.

Figure 10:
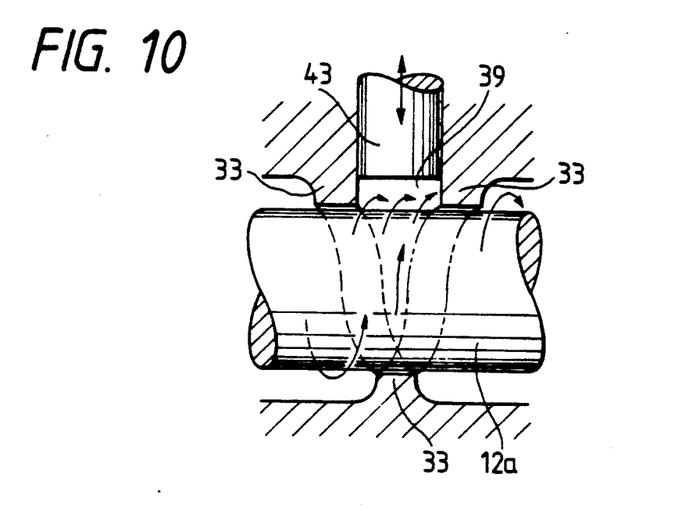
FIG. 10 is a sectional view showing a single-screw extruder constructed in accordance with a third embodiment of the invention taken along a line X—X in FIG. 11.
Figure 11:
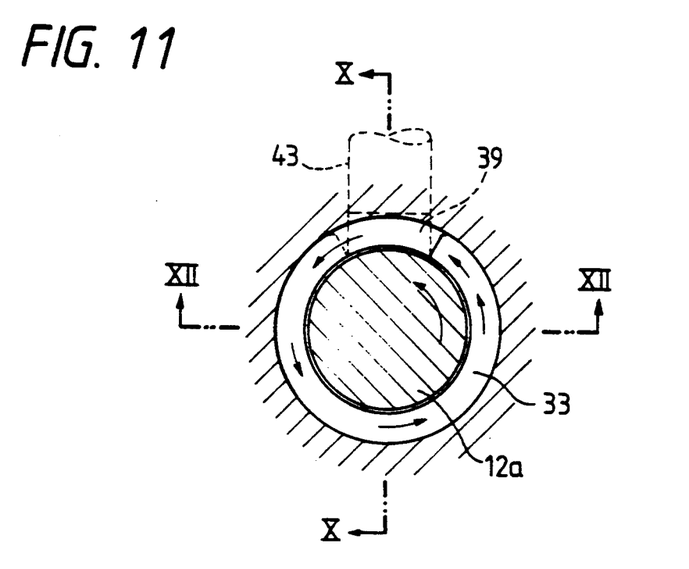
FIG. 11 is a diagram showing the third embodiment as viewed in the axial direction of the screw.
Figure 12:
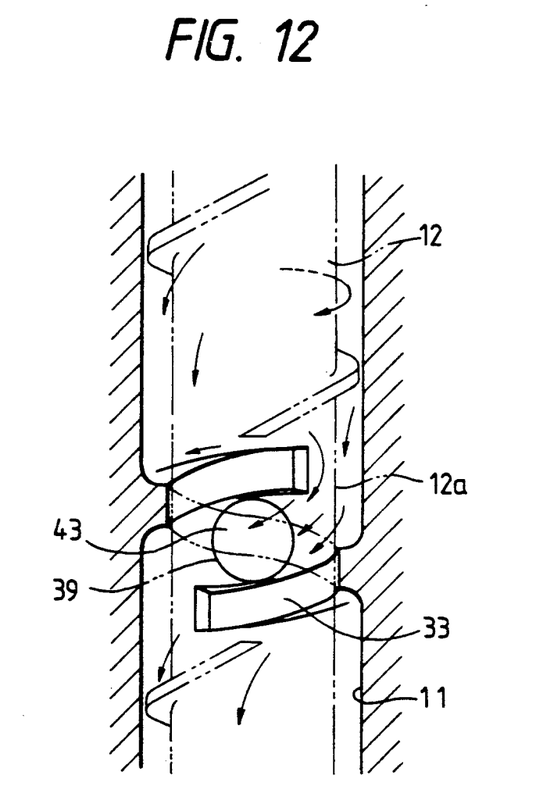
FIG. 12 is a sectional view taken along a line XII—XII in FIG. 11.

A third embodiment is shown in FIGS. 10 through 2, in which the inventive concept is applied to a single-screw extruder. In the third embodiment, a blocking wall 33 is in the form of a spiral continuous thread. The direction of twist of the spiral continuous thread is so determined that when the screw 12 is rotated, the raw material is moved form the upstream end to the downstream end (i.e. downward in FIG. 12). The continuous thread spirals about 360° around the cylindrical parts of screws, and its circumferential end portions form both side walls of communicating path. A hole-shaped communicating path 39B is provided between the circumferential end portions of the spiral continuous thread. A vertically movable valve 43 is provided in the communicating path 39.

In this embodiment also, as the screw 12 is rotated, the resin is forced to flow from the upstream end to the downstream end of thread. In this operation, substantially all of the resin passes through the communicating path 39. The cross-sectional area of the communicating path 39 can be adjusted with the valve 43, and therefore the degree of kneading can be accurately adjusted to a desired valve. As described above, the blocking wall 33 is in the form of a spiral continuous thread, and the resin flows smoothly along the blocking wall; that is, the resin will never accumulate locally.

Figure 13:
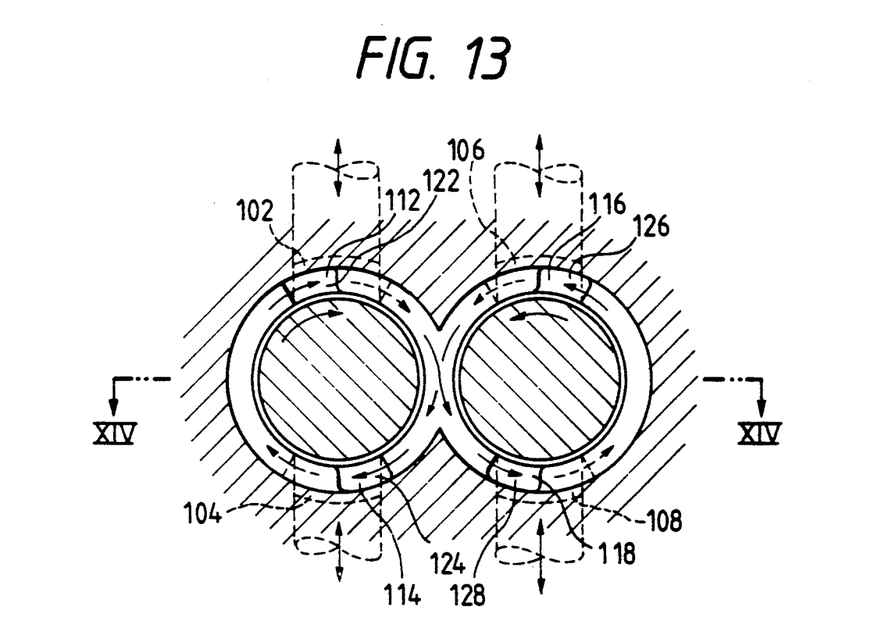
FIG. 13 is a sectional view showing a degree-of-kneading adjusting section in the twin screw counter rotating extruder of FIG. 1.
Figure 14:
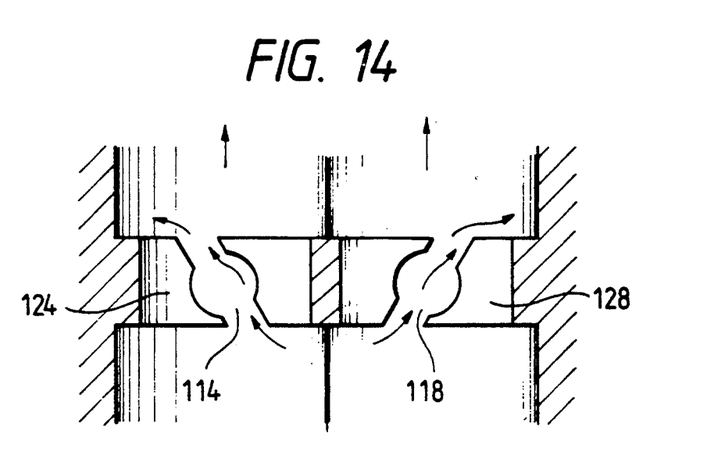
FIG. 14 is a sectional view taken along a line XIV in FIG. 13.
Figure 18:
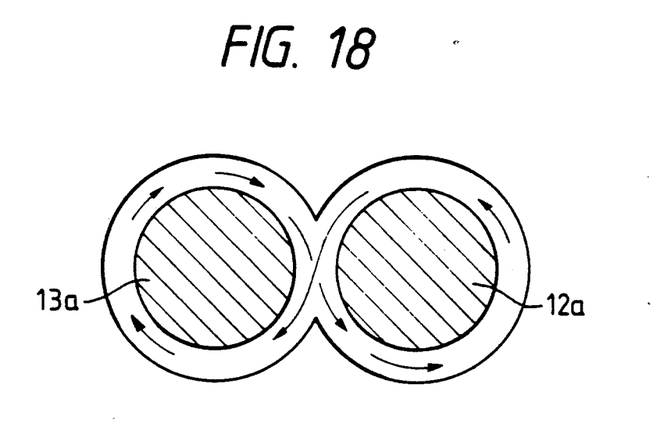
FIG. 18 is a flow pattern of raw material in cross section of twin counter rotating extruder.

FIGS. 13 through 16 are the other embodiments of this inventive concept applied to a counter rotating twin-screw extruder. Since screw 12 and 13 are rotated in the counter direction, the flow pattern of raw material is, as shown in FIG. 18, 8-shaped along the inner walls of the twin screw holes as viewed at the cross section of the barrel. Therefore, the blocking walls and the communicating paths are different from the embodiments in the co-rotating twin extruder. That is, in the counter rotating extruder, the resin will flow in a crosswise. Accordingly, the valves are effectively arranged to make the best use of these characteristics. In FIG. 13, four valves 102, 104, 106 and 108 are provided to possibly decrease the resistance at the blocking walls. In the counter-rotating twin-screw extruder shown in FIGS. 13 and 14, the communicating paths 112, 114, 116 and 118 for communicating the upstream side of said blocking wall with the downstream side thereof in said barrel are formed in the blocking walls 122, 124, 126 and 128 at the upper and lower sides of each screw, respectively.

Figure 15:
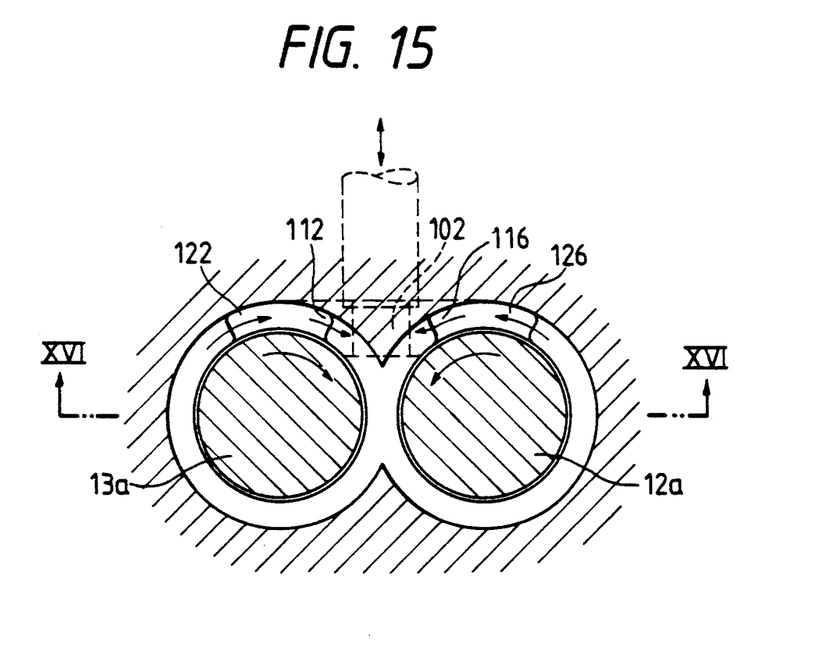
FIG. 15 is a sectional view showing a second embodiment of the invention for the twin screw counter rotating extruder.
Figure 16:
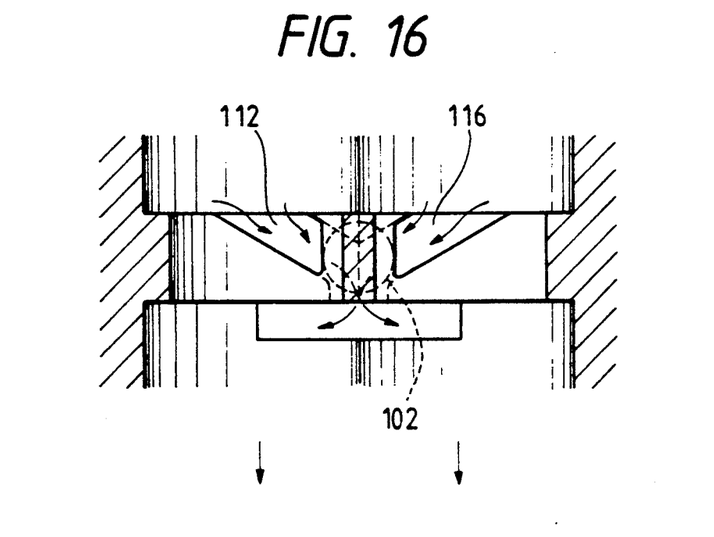
FIG. 16 is a sectional view taken along a line XVI in FIG. 15.

In the counter-rotating twin-screw extruder in FIGS. 15 and 16, there are provided a valve 102 and two communicating paths 112 and 116. The communicating paths 112 and 116 are formed in the portions of the blocking walls 122 and 126, which portions are positioned at the upper parts of the respective screws in a such a manner that raw material to be moved along the inner wall of the barrel to the blocking walls separating the twin-screw holes is forced to flow into the communicating paths and flow out to the downstream side of the blocking walls.

As discussed above, according to the invention, communicating paths are formed in the blocking walls between the twin screw holes, which paths are controlled in cross-sectional area by the valves with the result that the degree of kneading can be adjusted as desired.

What is claimed is:

1. In a co-rotating twin-screw unidirectional-rotation type extruder including a barrel having a degree-of-kneading adjusting section and a kneading section disposed therein, said adjusting section being disposed downstream of said kneading section, said extruder having a pair of screws with flights respectively mounted in twin screw holes axially provided in said barrel, in which raw material to be extruded as a resin and fed via said twin screw hole in the barrel is heated and kneaded while being conveyed by the two screws, which are rotated in the same direction while being engaged with each other, so as to extrude said resin, the improvement wherein:

each of said screws has a cylindrical portion in said adjusting section adjacent to a downstream side of said kneading section, which cylindrical portion is smaller in diameter than flights of said screws;

blocking walls circumscribing said cylindrical portions of said screws with small gaps therebetween are provided in said screw holes at positions, in an axial direction of said screws, corresponding to said cylindrical portions, and are arranged in such a manner as to divide said twin screw holes into upstream and downstream sides;

said blocking walls extending over the entire length of said cylindrical portions of said screws;

communicating paths are formed in the upper and lower sides of said blocking walls in such a manner that one of said communicating paths communicates the upstream side of said blocking wall on the side of one of said twin screw holes with the downstream side of said blocking wall on the side of the other of said twin screw holes, and the other of said communicating paths communicates the upstream side of said blocking wall on the side of the other of said twin screw holes with the downstream side of said blocking wall on the side of the one of said twin screw holes; and valve means for controlling cross-sectional areas of said communicating paths are provided in each of said communicating paths.

* * * * *